March 24, 1931.  J. SWINSCOE ET AL  1,797,736
BEARING OR CARRIER MOUNTING
Filed Nov. 7, 1927
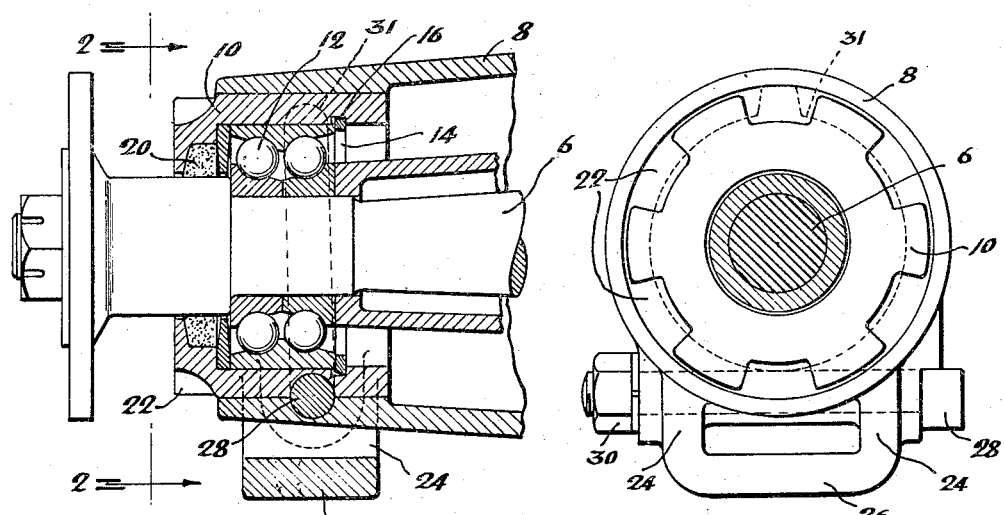
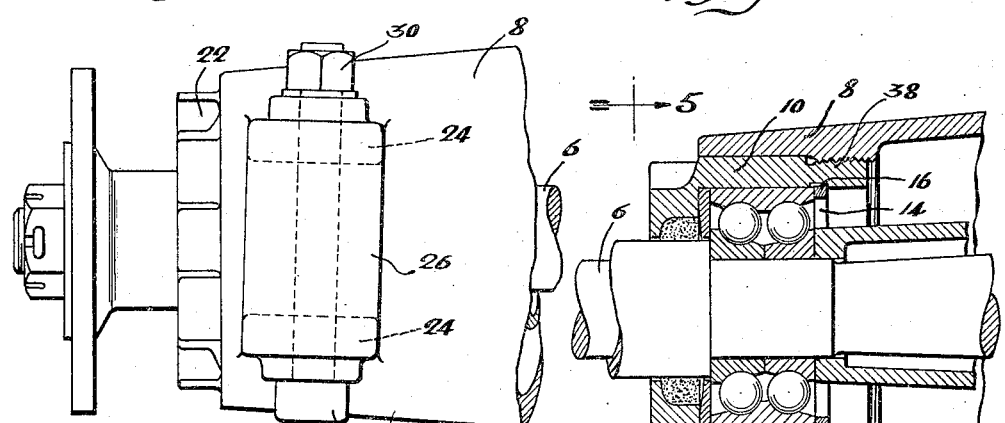
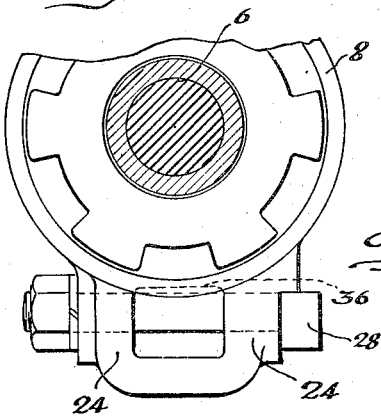
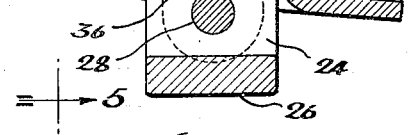
Inventors
John Swinscoe
Harry A. Johnson
Charles Earl Watson
By Blackmore, Spencer & Hulse
Attorneys Patented Mar. 24, 1931

1,797,736

UNITED STATES PATENT OFFICE

JOHN SWINSCOE, OF DAYTON, OHIO, AND HARRY A. JOHNSON AND CHARLES EARL WATSON, OF SYRACUSE, NEW YORK, ASSIGNORS TO GENERAL MOTORS CORPORATION, OF DETROIT, MICHIGAN, A CORPORATION OF DELAWARE

BEARING OR CARRIER MOUNTING

Application filed November 7, 1927. Serial No. 231,722.

This invention relates to an arrangement for securing a bearing or carrier in a supporting sleeve and is particularly designed for securing the differential pinion carrier, common in automobile construction, within the tubular extension of the rear axle housing provided for the purpose. Heretofore, it has been customary to clamp the carrier in the tubular extension by splitting the outer end of the extension and clamping the split portion about the carrier. With this arrangement, it has been found that when the clamping bolt is drawn up the tubular extension is distorted more or less out of round with the result that the clamping action is not effective throughout the entire circumference of the carrier, and there is possibility of the pinion shaft being forced slightly out of line.

Our invention consists in clamping the carrier in place by contracting the tubular support about the carrier but differs from prior practices in that the housing is not slotted, but the metal itself is compressed to give the desired contraction. This may be done in a number of ways but the preferred method consists in forming lugs upon the tubular extension and connecting the lugs by a tension member such as an ordinary bolt. When the bolt is drawn up, the metal between the lugs is compressed while the remaining circumference of the housing is subjected to tension with the result that the tubular support is contracted the desired amount and caused to grip the carrier. The section of the metal of the housing between the lugs may be lighter than that of the rest of the housing so as to permit more effective compression and consequently better gripping action. Our design may likewise embody a feature shown in the prior application of Donald D. Ormsby and John Swinscoe, Serial No. 231,618 filed November 7, 1927, in that the carrier may be a sliding fit in the tubular support and may be provided with a spiral groove to receive a portion of the bolt so that upon rotation of the carrier it is caused to move axially to effect adjustment of the engagement between the pinion and ring gear of the differential. However, if preferred, the carrier may simply be threaded into the tubular extension as in present practices.

In the drawings, Figure 1 is a longitudinal section showing my method of mounting the carrier in the housing extension. Figure 2 is a view on line 2—2 of Figure 1. Figure 3 is a bottom plan view of Figure 1. Figure 4 is a view similar to Figure 1 but showing a slight modification. Figure 5 is a view on line 5—5 of Figure 4. The reference character 6 indicates the shaft carrying the usual pinion for meshing with the ring gear in conventional differential construction. 8 indicates a tubular support extending forwardly from the rear axle and housing the shaft 6. 10 indicates the carrier for the shaft 6. Antifriction bearing 12 is secured in a socket formed in the carrier by means of split ring 14 snapped into groove 16 provided in the carrier. In the outer end of the carrier a groove is provided to receive packing 20 to prevent the escape of oil. The outer end of the carrier is provided with notches 22 to permit application of a wrench for adjusting the carrier. The tubular extension 8 is provided with spaced lugs 24 connected by arched portion 26. Bolt 28 passes through apertures provided in the lugs and carries at one end the nut 30. In the form shown in Figures 1 to 3 the carrier 10 is in the form of a cylinder and is provided with a spiral groove 31 into which an intermediate portion of the bolt 28 projects, as best shown in Figure 1.

With the parts assembled as shown in Figure 1, rotation of the carrier 10 will affect axial adjustment thereof, and consequently of the shaft and pinion, because of the engagement of the bolt 28 in the groove 31. When the desired adjustment has been made, tightening of the nut 30 will contract the tubular support 8 about the carrier and lock it in position. This contraction is produced by compression of the metal of the support between the lugs 24 and the subjection of the remainder of the circumference of the support to tension as a result of the same clamping action. This, we have found to be a very effective means for securing the carrier in place. The arched portion 26 braces the lugs and prevents their collapse. In the form shown in Figures 1 to 3, the section of the metal between the lugs 24 is somewhat weakened by the metal removed to permit passage of the bolt 28. However, if desired, the metal between the lugs may be made of lighter section throughout. This is illustrated in Figures 4 and 5 where the portion of the tubular extension 8 extending between the lugs 24 is reduced in thickness as shown at 36. In this form likewise the carrier 10 is merely threaded in the housing extension as shown at 38 in the conventional way and the bolt 28 extends clear of the support between the lugs.

In either of the described forms, tightening of the drawbolt does not distort the housing out of round, but merely subjects it to substantially uniformed contraction which causes it to firmly grip the carrier and lock it in place with the advantages pointed out.

We claim:

1. The combination of a tubular support, a cylindrical bearing member mounted in the support, circumferentially spaced abutments on the support, an arch connecting said abutments, the wall of said bearing member between said abutments being of reduced thickness, and means for drawing the abutments together to compress the metal therebetween and cause the bearing member to grip the support.

2. In the combination as defined in claim 1, said means comprising a draw bolt connecting said abutments.

3. The combination of a tubular support, a cylindrical bearing member mounted in the support, spaced abutments on the support, an arch connecting said abutments, a drawbolt connecting said abutments for drawing the latter together to cause the support to grip the bearing member, said last-named means cooperating with said member to cause the latter to move axially when rotated.

4. In the combination of a tubular support having the form of a complete annulus in cross section, a cylindrical carrier slidably mounted in the support, and a tension member associated with the tubular support for contracting the support about the bearing member to cause it to grip the latter and hold it in position, said bearing member being provided with a spiral slot for receiving a portion of the tension member whereby rotation of the bearing member affects axial adjustment thereof.

5. The combination of a tubular support, a cylindrical carrier slidable in the support, said support being provided with spaced lugs, an arched portion connecting said lugs, a tension member connecting said lugs and arranged to compress the metal therebetween to cause the support to grip the bearing member, said bearing member being formed to co-operate with said tension member to cause axial motion thereof upon rotation.

6. In the combination as defined in claim 5, said bearing member being provided with a spiral slot in which the tension member is received to affect said adjustment.

7. In the combination as defined in claim 5, and a gear carrying shaft mounted in said carrier.

8. The combination of a tubular support, a bearing member mounted in the support, circumferentially spaced abutments on the support, the wall of the support between said abutments being of reduced thickness, and means for drawing the abutments together to compress the metal between them and cause the support to grip the bearing member.

9. A combination of a support in the form of a tube of continuous circular cross section, a bearing member fitted in the support, circumferentially spaced abutments fixed on the exterior of the support, and tension means connecting said abutments and adapted to be drawn up to shift the abutments toward each other compressing the metal of the support between the abutments and in engagement with the member and causing the support to grip the bearing member.

In testimony whereof I affix my signature.
JOHN SWINSCOE.
In testimony whereof I affix my signature.
HARRY A. JOHNSON.
In testimony whereof I affix my signature.
CHARLES EARL WATSON.